(12) United States Patent
Kitayama et al.

(10) Patent No.: US 6,811,388 B2
(45) Date of Patent: Nov. 2, 2004

(54) MOLD CLAMPING UNIT AND INJECTION MOLDING APPARATUS

(75) Inventors: Takeo Kitayama, Scarsdale, NY (US); Atsushi Saitoh, Sakata (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 43 days.

(21) Appl. No.: 10/076,608

(22) Filed: Feb. 19, 2002

(65) Prior Publication Data

US 2002/0160070 A1 Oct. 31, 2002

(30) Foreign Application Priority Data

Feb. 19, 2001 (JP) ..................................... P2001-042232

(51) Int. Cl.⁷ ............................................. B29C 45/67
(52) U.S. Cl. ..................... 425/190; 425/589; 425/595
(58) Field of Search ................................ 425/190, 589, 425/595, 450.1, 451.9

(56) References Cited

U.S. PATENT DOCUMENTS

| | | | | |
|---|---|---|---|---|
| 5,129,806 A | * | 7/1992 | Hehl ........................ | 425/450.1 |
| 5,219,584 A | * | 6/1993 | Itsuzi et al. ................. | 425/589 |
| 5,238,383 A | * | 8/1993 | Bannai ..................... | 425/451.9 |
| 5,660,783 A | * | 8/1997 | Urbanek et al. ............ | 425/595 |
| 6,109,910 A | * | 8/2000 | Sekido ....................... | 425/589 |
| 6,120,724 A | * | 9/2000 | Glaesener ................... | 425/589 |
| 6,394,787 B1 | * | 5/2002 | Kobayashi ................. | 425/595 |

FOREIGN PATENT DOCUMENTS

| | | |
|---|---|---|
| JP | 5-124072 | 5/1993 |
| JP | 8-309779 | 11/1996 |

* cited by examiner

Primary Examiner—James P. Mackey
(74) Attorney, Agent, or Firm—Fitch, Even, Tabin & Flannery

(57) ABSTRACT

A mold clamping unit employed in an injection molding apparatus for opening and closing a mold having a movable mold plate and a fixed mold plate. The mold clamping unit comprises a mold clamping cylinder, mold opening means for applying a mold opening force of a predetermined magnitude to the movable mold plate in the direction from the closed position to the fully open position and moving the movable mold plate from the closed position to the predetermined half-open position located between the closed position and fully open position, and switching means for switching the mold clamping force generated by the mold clamping cylinder between the first mold clamping force which is larger than the mold opening force and a second mold clamping force which is smaller than the mold opening force by switching the supply pressure of working fluid supplied to the mold clamping cylinder. In such a configuration, special mold opening means for moving the movable mold plate from the closed position to the half-open position is provided separately in addition to the mold clamping cylinder. As a result, the movable mold plate can be accurately moved to the half-open position.

17 Claims, 8 Drawing Sheets

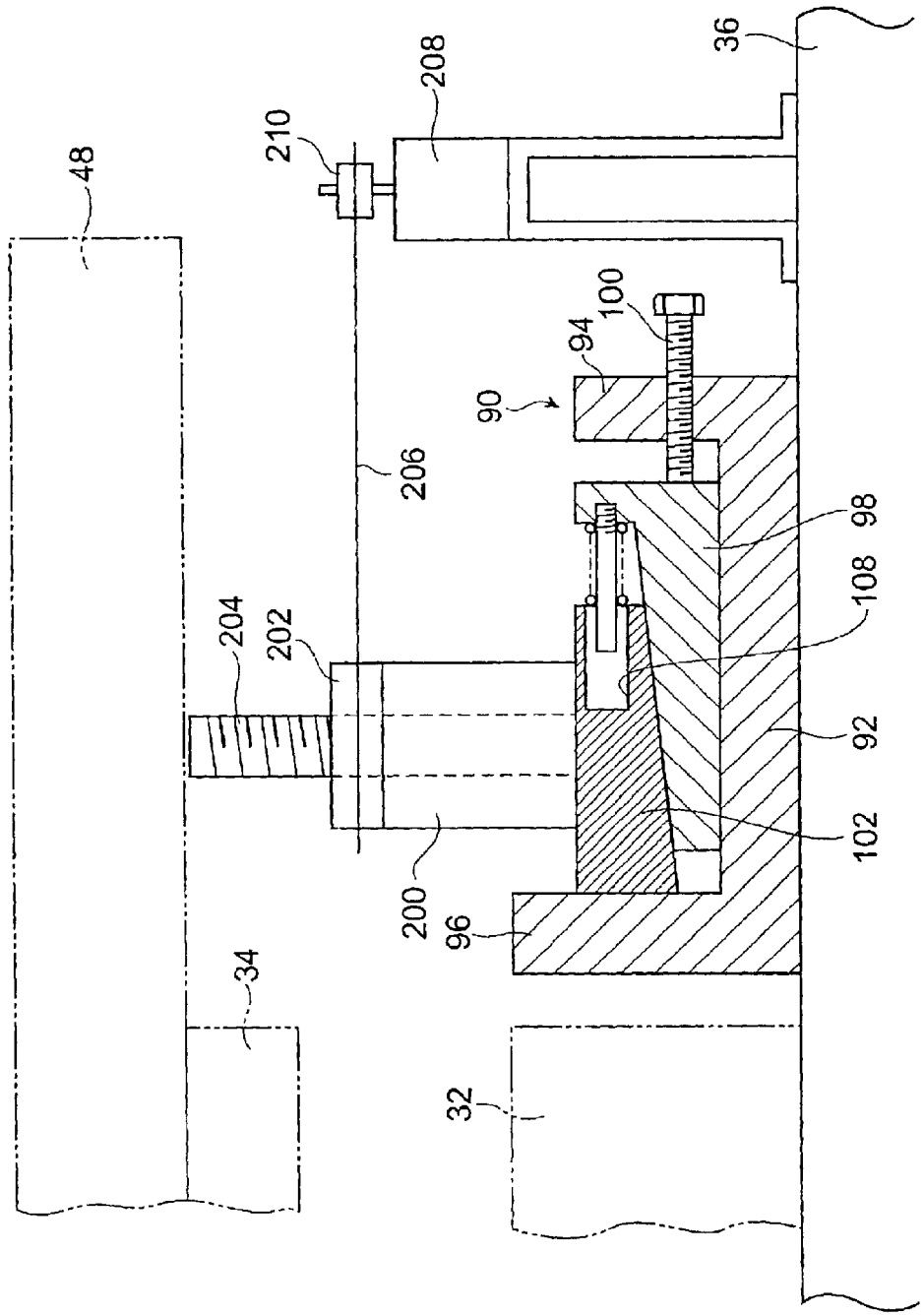

MOLD CLAMPING UNIT AND INJECTION MOLDING APPARATUS

BACKGROUND OF THE INVENTION

1. Field of the Invention

The present invention relates generally to a molding apparatus such as an injection molding apparatus, more specifically to a mold clamping unit employed in such a molding apparatus.

2. Description of the Related Art

A typical conventional mold clamping unit employed in an injection molding apparatus, for example, for foam molding comprises a mold clamping cylinder in which a ram is directly mounted on a movable mold plate of the mold. In such a mold clamping unit, opening and closing of the mold is conducted by bringing the movable mold plate in contact with the fixed mold plate and withdrawing the movable mold plate from the fixed mold plate by extension and contraction of the mold clamping cylinder.

When foam molding is conducted, the cavity of the closed mold is filled with plasticized resin, then the mold clamping cylinder is contracted and the movable mold plate is retracted through a very small distance to a half-open position. As a result, the cavity is expanded. After waiting for the plasticized resin to foam in this state, the mold clamping cylinder is further contracted, so that the movable mold plate is retracted to a final fully open position, and the molding is then removed from the mold.

However, the problem arising when the above-described conventional mold clamping unit is used is associated with the appearance of defects such as a variation in the thickness of a molding. This is because one mold clamping cylinder is used in the conventional mold clamping unit for moving the movable mold plate from the closed position to the half-open position and then to the fully open position. Thus, the mold clamping cylinder for moving the movable mold plate between the closed position and fully open position has a large capacity and, therefore, requires a large amount of working fluid for driving the mold clamping cylinder. As a result, when the movable mold plate is retracted through a very small distance from the closed position to the half-open position, a variation in the distance traveled by the movable mold plate can easily occur, leading to a variation in the thickness of a molding.

Another problem is that when a large-capacity mold clamping cylinder is used, the response during the retraction of the movable mold plate from the closed position to the half-open position is poor and high-speed operation is difficult to conduct. This is because a comparatively large amount of working fluid is required for retracting the movable mold plate from the closed position to the half-open position with the large-capacity mold clamping cylinder. A poor response of the actuation of the movable mold plate to the half-open position and a low operation speed also adversely affect the quality of foamed moldings.

Accordingly, a main object of the present invention is to provide a mold clamping unit capable of accurately moving the movable mold plate from the closed position to the half-open position.

Another object of the present invention is to provide a mold clamping unit capable of moving the movable mold plate from the closed position to the half-open position with good response and a high speed.

SUMMARY OF THE INVENTION

In order to attain the above-described objects, the present invention provides a mold clamping unit which is used in a molding apparatus and serves to open and close a mold having a movable mold plate and a fixed mold plate, this mold clamping unit comprising a mold clamping cylinder driven by supply or discharge of a working fluid and moving the movable mold plate between a fully open position located away from the fixed mold plate by the predetermined distance and a closed position in which the movable mold plate is in contact with the fixed plate, mold opening means for applying a mold opening force of a predetermined magnitude to the movable mold plate in the direction from the closed position toward the fully open position, thereby moving the movable mold plate from the closed position to the predetermined half-open position located between the closed position and the fully open position, switching means for switching the mold clamping force generated by the mold clamping cylinder between a first mold clamping force which is larger than the mold opening force and a second mold clamping force which is smaller than the mold opening force by switching the supply pressure of the working fluid supplied to the mold clamping cylinder, and control means for controlling the mold opening means and the switching means.

With this arrangement, a special mold opening means is separately provided, in addition to the mold clamping cylinder, for moving the movable mold plate from the closed position to the half-open position. Therefore, the movable mold plate can be accurately moved to the half-open position. Furthermore, such a movement can be conducted with a high speed and good response.

Various types of control of mold opening means and switching means can be considered, but it is preferred that the switching means be controlled so that the mold clamping force becomes the first mold clamping force when the movable mold plate is moved to the closed position. In such a case, even if the mold opening means is activated, the mold can be closed because the first clamping force is larger than the mold opening force generated by the mold opening means. Furthermore, if the switching means is controlled so that the mold clamping force becomes the second mold clamping force when the movable mold plate is moved from the mold clamping state to the half-open position, the movement of the movable mold plate from the closed position to the half-open position can be initiated within a short period of time because the mold opening force is larger than the second mold clamping force. Thus, the response of mold opening operation to the half-open state is improved. In addition, since the movable mold plate is in a state in which it is pushed in the mold clamping direction by a mold clamping cylinder, the movable mold plate that was retracted to the half-open position by the mold opening means can also be prevented from further moving in the direction toward the fully opened position under an inertia force.

Furthermore, for example, when foam molding is conducted in which the movable mold plate is retracted from the closed position to the half-open position so that the plasticized resin inside the cavity of the mold is foamed, the plasticized resin placed into the cavity of the mold in the half-open state will be partially separated from the cavity surface because of volume shrinkage caused by decrease in temperature. As a result, the surface shape of a molding sometimes does not accurately match that of the cavity and defects are formed in the molding.

Accordingly, the control means may also control the switching means so that the mold clamping force becomes the first mold clamping force for the purpose of moving the movable mold plate again toward the closed position after it was moved to the half-open position. As a result, the resin in a semihardened state is again compressed in the mold and, therefore, a molding can be prevented from being strained.

When the mold clamping unit further comprises a mounting stand on which the fixed mold plate is mounted and a mounting plate on which the movable mold plate is mounted, the mold opening means may be that comprising an extension and contraction mechanism which is disposed between the mounting stand and mounting plate and can extend and contract in the mold clamping direction, a drive source for driving the extension and contraction mechanism, and stop means for terminating the extension and contraction operation of the extraction-contraction mechanism once the movable mold plate has been moved from the closed position to the half-open position.

In this case, it is preferred that a hydraulic cylinder be used as the extension and contraction mechanism, that a hydraulic pump supplying working fluid to the hydraulic cylinder be used as the drive source, and that the end portion of a cylinder tube at the rod side thereof, which is brought in contact with the piston when the hydraulic cylinder is extended, be used as the stop means.

Providing, between the extension and contraction mechanism and the mounting stand, a position adjusting tool that adjusts the position of the extension and contraction mechanism in the mold clamping direction can also be effective. This is because even when the mold is replaced by another mold of different size, the position of the extension and contraction mechanism can be adjusted by the position adjusting tool.

A preferable position adjusting tool is that comprising a first block having a first surface and a second surface opposite to the first surface and a second block having a third surface that is slidably in contact with the second surface of the first block and a fourth surface opposite to the third surface and has a configuration, with respect to the first and second blocks, such that the spacing between the first surface and the fourth surface can be adjusted by the mutual wedge effect of the first block and second block.

The present invention in another aspect thereof provides an injection molding apparatus comprising the above-described mold clamping unit, a mold, and an injector for injecting a plasticized resin into the mold. Because the mold clamping unit has the above-described operation effect, the injection molding apparatus can make moldings have thickness uniform therebetween, and can produce high-quality moldings.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIG. 8 is similar to FIG. 3 and illustrates another mold opening means.

DESCRIPTION OF THE PREFERRED EMBODIMENT

In the following description, like references characters designate like or corresponding parts throughout the several views.

Figure 1:
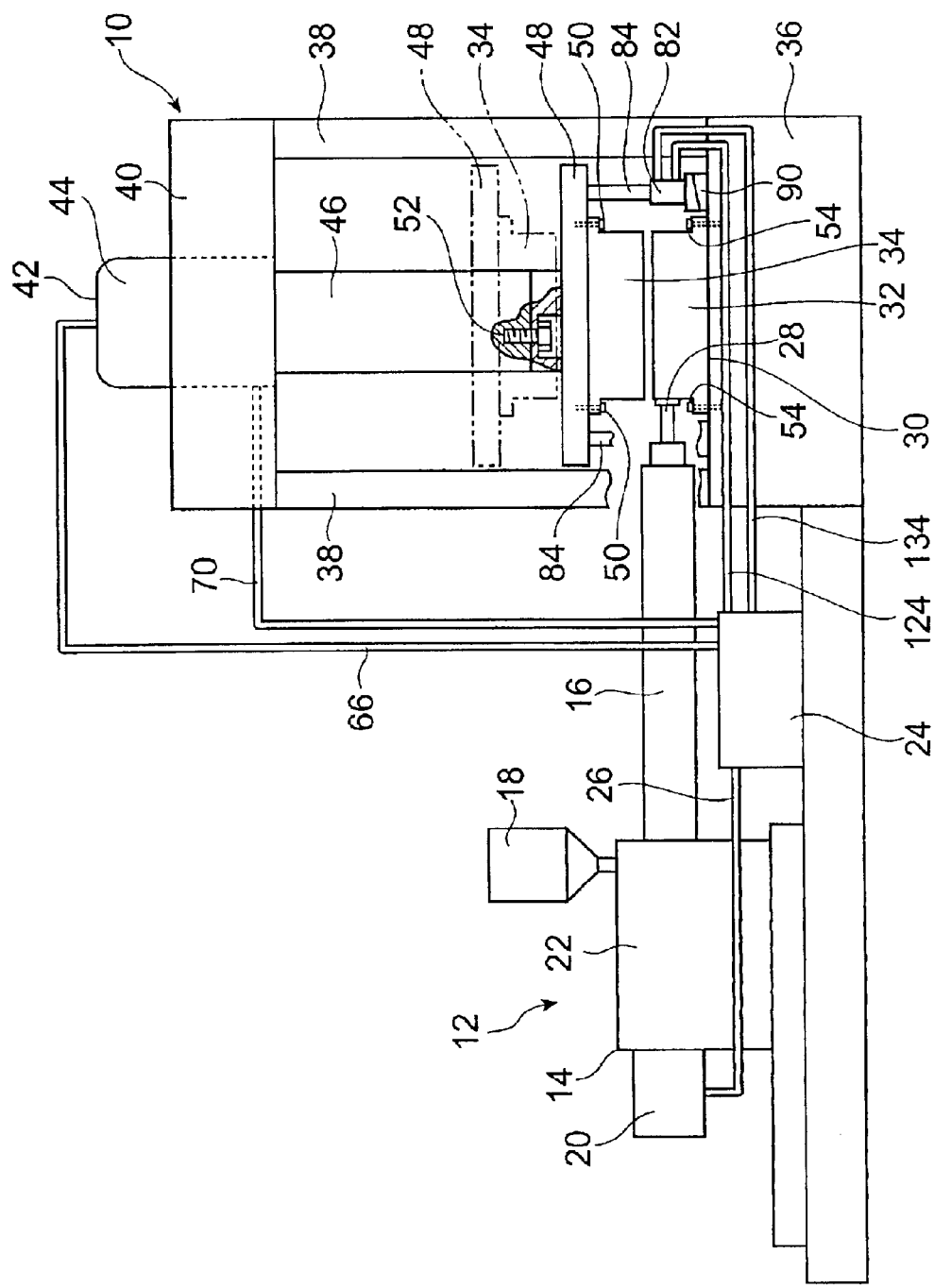
FIG. 1 is a side view schematically showing an injection molding apparatus having a mold clamping unit in accordance with the present invention.

With reference to figures, particularly to FIG. 1, schematically illustrates an injection molding apparatus 12 equipped with a mold clamping unit 10 in accordance with the present invention, with a part thereof being cut off, is illustrated schematically. The injection molding apparatus 12 shown in the figure is designed for foam molding and is provided with an injector 14 of a lateral injection system. The injector 14 is of a conventional screw type, and has an internal screw (not shown), a cylinder tube 16 disposed horizontally, a hopper 18 for charging a resin, which is the material to be molded, into the cylinder tube 16, a hydraulic cylinder 20 for moving the screw forward and backward, and a rotary drive apparatus 22 for rotary driving the screw. A hydraulic control unit (not shown) for controlling the drive of hydraulic cylinder 20 is provided inside a control box 24 disposed in the vicinity of injector 14. A line connecting the hydraulic control unit and hydraulic cylinder 20 is shown by a reference numeral 26 in FIG. 1. Furthermore, a nozzle 28 for injecting a plasticized resin fed by the rotary and forward-backward movement of the screw is provided at the front end of cylinder tube 16. The nozzle 28 is connected to a cavity (not shown) of a mold 30.

The mold 30 is composed of a fixed mold plate 32 and a movable mold plate 34. A mold clamping unit 10 for opening and closing the mold 30 comprises a mounting stand 36 on which the fixed mold plate 32 is mounted, a plurality of support columns 38 (four columns in the embodiment shown in the figure) extending upward in an almost vertical direction and secured on the outer periphery of the mounting stand 36, a cylinder mounting plate 40 supported on the upper ends of those support columns 38, and a mold clamping cylinder 42 mounted on the cylinder mounting plate 40 and actuating the movable mold plate 34.

The mold clamping cylinder 42 comprises a cylinder tube 44 secured to the cylinder mounting plate 40 and a ram 46 serving as an output shaft protruding from one end of cylinder tube 44. The cylinder tube 44 is secured to the cylinder mounting plate 40 so that the ram 46 extends downward in the vertical direction toward the fixed mold plate 32.

The movable mold plate 34 of mold 30 is attached to the lower end of ram 46. More specifically, the movable mold plate 34 is detachably attached with bolts 50 to the lower surface of a mounting plate 48, and the mounting plate 48 is attached with bolts 52 to the lower end of ram 46. The area of the lower surface of mounting plate 48 is greater than that of the upper surface of movable mold plate 34 and the peripheral portion of mounting plate 48 protrudes as a flange beyond the outer periphery of movable mold plate 34. The fixed mold plate 32 of mold 30 is also detachably attached to the mounting stand 36 with bolds 54.

Figure 2:
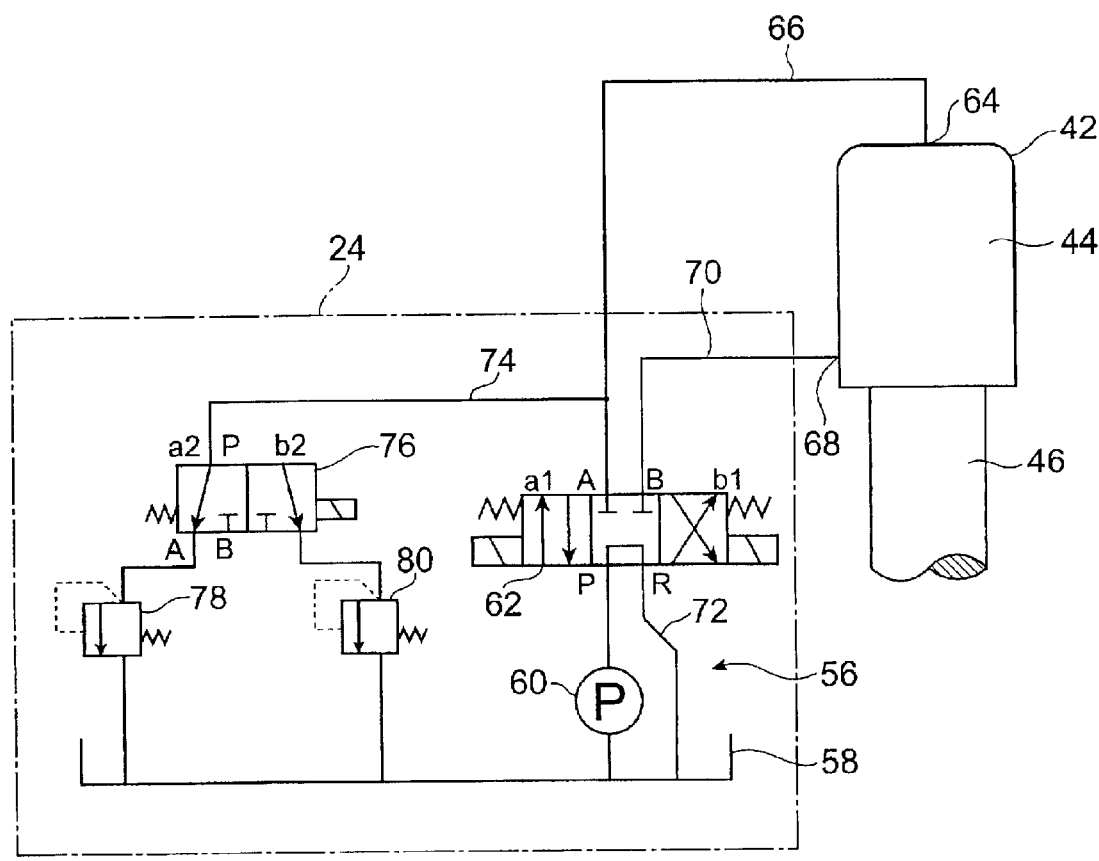
FIG. 2 is a hydraulic circuit diagram showing a hydraulic control unit for hydraulic control of a mold clamping cylinder of the mold clamping unit shown in FIG. 1.

The drive of mold clamping cylinder 42 for moving the movable mold plate 34 toward and from the fixed mold plate 32 is controlled by a hydraulic control unit 56 for clamping which is provided inside the control box 24, as shown in FIG. 2. The hydraulic control unit 56 comprises a hydraulic pump 60 for suction of a working fluid from an oil tank 58 and supplying it under pressure to the mold clamping cylinder 42. A direction control valve 62, preferably, a three-position four-port electromagnetic spool valve, is connected to the discharge opening of hydraulic pump 60. The A port of this direction control valve 62 is connected via a line 66 to a head-side port 64 of mold clamping cylinder 42, and the B port is connected via a line 70 to a ram-side port 68 of mold clamping cylinder 42. Furthermore, in the neutral position of the direction control valve 62, the P port and the R port are connected to each other and the A port and B port are closed. At the first position a1, the P port and A port are interconnected to each other and the R port and B port are interconnected to each other. At the second position b1, the P port and B port are interconnected to each other and the R port and A port are interconnected to each other. Therefore, if the position of direction control valve 62 is switched to the first position a1, the working fluid discharged by hydraulic pump 60 flows through the head-side port 64 of mold clamping cylinder 64 into the cylinder tube 44, the ram 46 is moved downward, and the mold 60 is closed. Furthermore, if the position of direction control valve 62 is switched to the second position b1, the working fluid flows through the ram-side port 68 of mold clamping cylinder 44 into the cylinder tube 44, the ram 46 is moved upward, and the mold 60 is opened. The work oil discharged from the cylinder tube 44 in association with the movement of ram 46 is returned to the oil tank 58 via a recovery line 72.

A branch line 74 extends from the line 66. The branch line 74 is connected to a first and second pressure control valves 78, 80, preferably, relief valves, via a direction switching valve 76. The direction switching valve 76 is preferably a two-position three-port electromagnetic spool valve. When it is in a first position a2, the B port is closed and the P port and A port are interconnected to each other. When it is in a second position b2, the A port is closed and the P port and B port are interconnected to each other. The first and second pressure control valves 78, 80 are constituted so that they are opened when the upstream pressure becomes no less than the preset pressure. The preset pressure of the first pressure control valve 78 is set higher than that of the second pressure control valve 80. Therefore, selecting the pressure control valves 76, 78 connected to the line 66 and switching the position of direction switching valve 76 makes it possible to switch the upper limit value of the pressure applied to the mold clamping cylinder 64 between a high pressure and a low pressure, that is, to switch the upper limit value of the mold clamping force generated by the mold clamping cylinder 64 between the two, high and low, values. In other words, the direction switching valve 76 and the first and second pressure control valves 78, 80 function as switching means for switching the feed pressure of the working fluid fed to the mold clamping cylinder. The larger of the mold clamping forces will be called a first mold clamping force F1, and the smaller one will be called a second mold clamping force F2.

In the embodiment shown in the figure, since the mold clamping unit 10 is of a vertical type, and the mold clamping force has a value obtained by adding the weights of movable mold plate 34, mounting plate 48 and ram 46 to the pressing force applied by the ram 46 of mold clamping cylinder 42.

Furthermore, in the mold clamping apparatus 10 shown in the figure, at least one (four in the embodiment shown in the figure) hydraulic cylinder 82 is provided as mold opening means for moving the movable mold from a closed position to the predetermined half-open position away from the fixed mold plate by a certain distance and stopping it temporarily in this half-open position for foam molding. Those hydraulic cylinders 82 have the same shape and the capacities thereof are correspondingly less than that of the mold clamping cylinder 42.

Those hydraulic cylinders 82 are disposed on the mounting stand 36 so as to surround the fixed mold plate 32. Furthermore, the cylinder tubes 86 of hydraulic cylinders 82 are mounted on the mounting stand 36 so that piston rods 84 extend upward in the vertical direction, that is, upward, almost parallel to the axial direction of mold clamping cylinder 42. Furthermore, the upper ends of piston rods 84 are disposed opposite the lower surface of the peripheral portion of mounting plate 48 protruding outward beyond the movable mold plate 34.

In a state in which the piston rods 84 are retracted the most into the cylinder tubes 86, that is, in a state in which the piston rods 84 are lowered the most (the most retracted position), the upper ends of piston rods 84 are positioned below the mounting plate 48 at the time when the mold 30 is in a closed state. Furthermore, if the piston rods 84 are raised in a state in which the hydraulic pressure fed to the mold clamping cylinder 42 is released or decreased significantly, the upper ends of piston rods 84 can be brought in contact with the mounting plate 48 and can raise it. At the upper stroke end, that is, in the most protruding position in which the pistons 85 are brought in contact with the rod-side end portion (stop means) 88 of cylinder tube 86, the mounting plate 48 which is in contact with the piston rods 84 comes to a position corresponding to a half-open position of movable mold plate 34 of mold 30.

Figure 3:
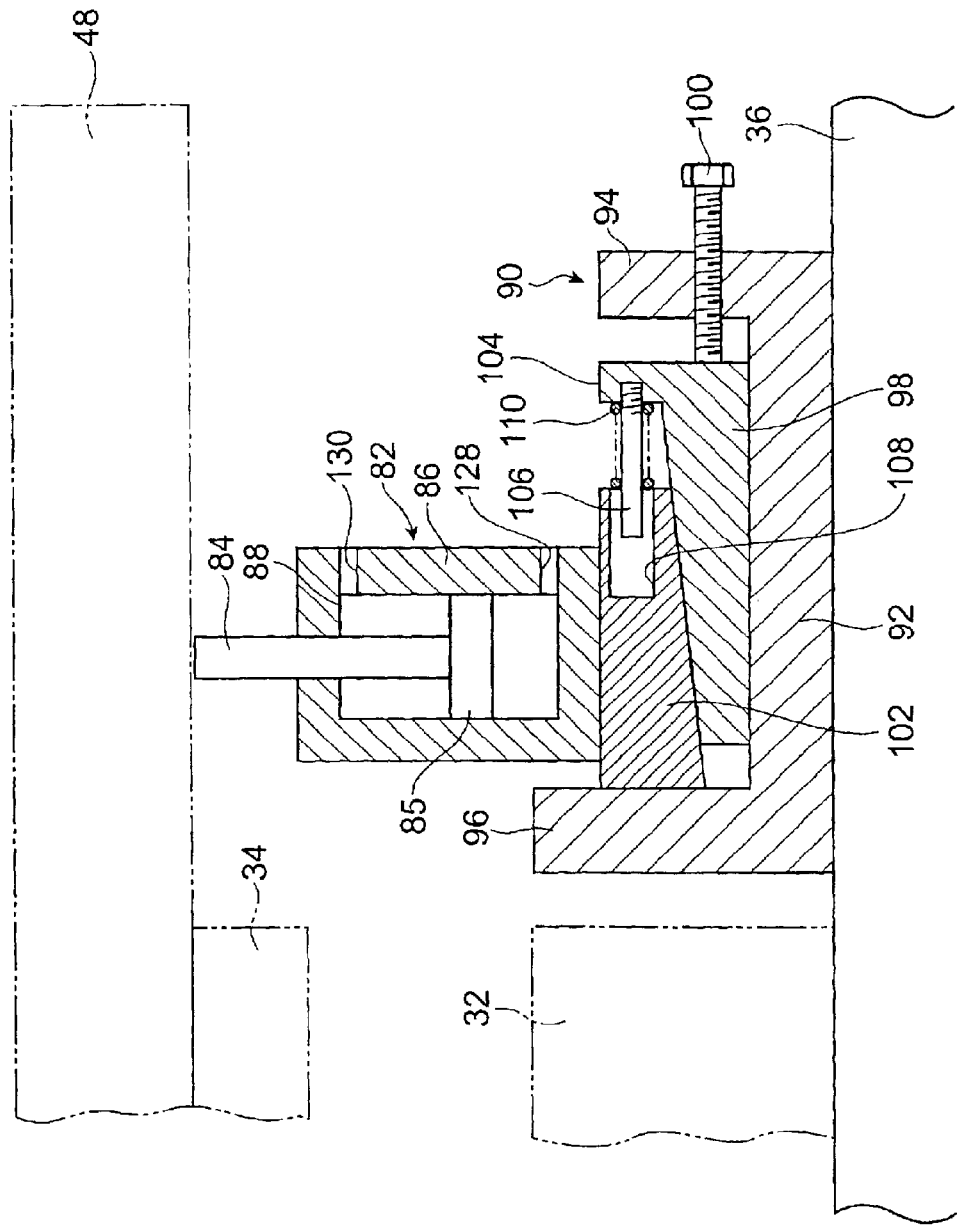
FIG. 3 is an expanded explanatory view showing a hydraulic cylinder and a position adjusting tool which constitute mold opening means.

It is difficult to obtain such a positional relationship with good accuracy. Furthermore, the level or position of hydraulic cylinder 82 in the mold clamping direction have to be adjusted each time the mold 30 is replaced. Therefore, as shown in FIG. 3, it is preferred that a position adjusting tool 90 be disposed between the hydraulic cylinder 82 and mounting stand 36.

The position adjusting tool 90 shown in the figure comprises a base member 92 secured to the mounting stand 36 and having raised walls 94, 96 disposed on both ends thereof. A wedge-like lower block (first block) 98 is slidably disposed on the base member 92. The end surface of lower block 98 in the thicker side thereof is disposed opposite one raised wall 94 and is in contact with the front end of a position adjusting screw 100 threaded into the raised wall 94. The lower surface (third surface) of wedge-like upper block (second block) 102 is slidably disposed on the upper surface (second surface) of lower block 98, and the upper surface (fourth surface) of upper block 102 extends in the horizontal direction, that is, parallel to the upper surface of mounting stand 36 and the upper surface of base member 92. A spring receiving wall 104 stands at the end portion of lower block 98 on the thicker side thereof, and one end of a guide shaft 106 is threaded into the spring receiving wall 104. The guide shaft 106 extends horizontally at the side of the other end of lower block 98 and is slidably inserted in a shaft hole 108 drilled in the upper block 102. As for the cross-sectional shape of this hole 108, the width thereof in the horizontal direction is substantially the same as the diameter of guide shaft 106, and the width thereof in the vertical direction is significantly larger than the diameter of guide shaft 106. Therefore, the cross-sectional shape of shaft hole 108 resembles a running track, and the guide shaft 106 can also slide in the vertical direction. A coil spring 110 is disposed around the guide shaft 106. The coil spring 110 is inserted in a compressed state thereof between the spring receiving wall 104 of lower block 98 and the upper block 102. Therefore, the end surface of upper block 102 on the thicker side thereof is constantly in contact with the raised wall 96, and the lower block 98 is constantly in contact with the front end of position adjusting screw 100. The hydraulic cylinders 82 are secured to the upper surface of upper block 102.

In such a position adjusting tool 90, if the position adjusting screw 100 is screwed into the raised wall 94, the lower block 98 is pushed and moved by the front end of position adjusting screw 100, and the lower block 98 is concealed below the upper block 102. In such a case, the upper block 102 is raised by the wedge action of lower block 98 and the distance between the lower surface (first surface) of lower block 98 and upper surface of upper block is increased. Furthermore, if the position adjusting screw 100 is rotated so as to recede from the raised wall 96, the lower block returns to the initial state by the action of coil spring 110, and the lower block 102 is lowered. As a result, the level and position of hydraulic cylinders 82 can be adjusted. Therefore, the distance in the vertical direction between the mounting stand 36 and the upper end of piston rods 84 in the upper stroke end in which the pistons 85 of hydraulic cylinders 82 are brought in contact with the upper end portions 88 of cylinder tubes 86, that is, the spacing between the fixed mold plate 32 and movable mold plate 34 defined when the mold 30 is in a half-open state, can be adjusted with the position adjusting screw 100. As a consequence, this spacing can be set to a target value by adjusting the position of hydraulic cylinder 82 in the vertical direction according to the type or size of mold 30.

Figure 4:
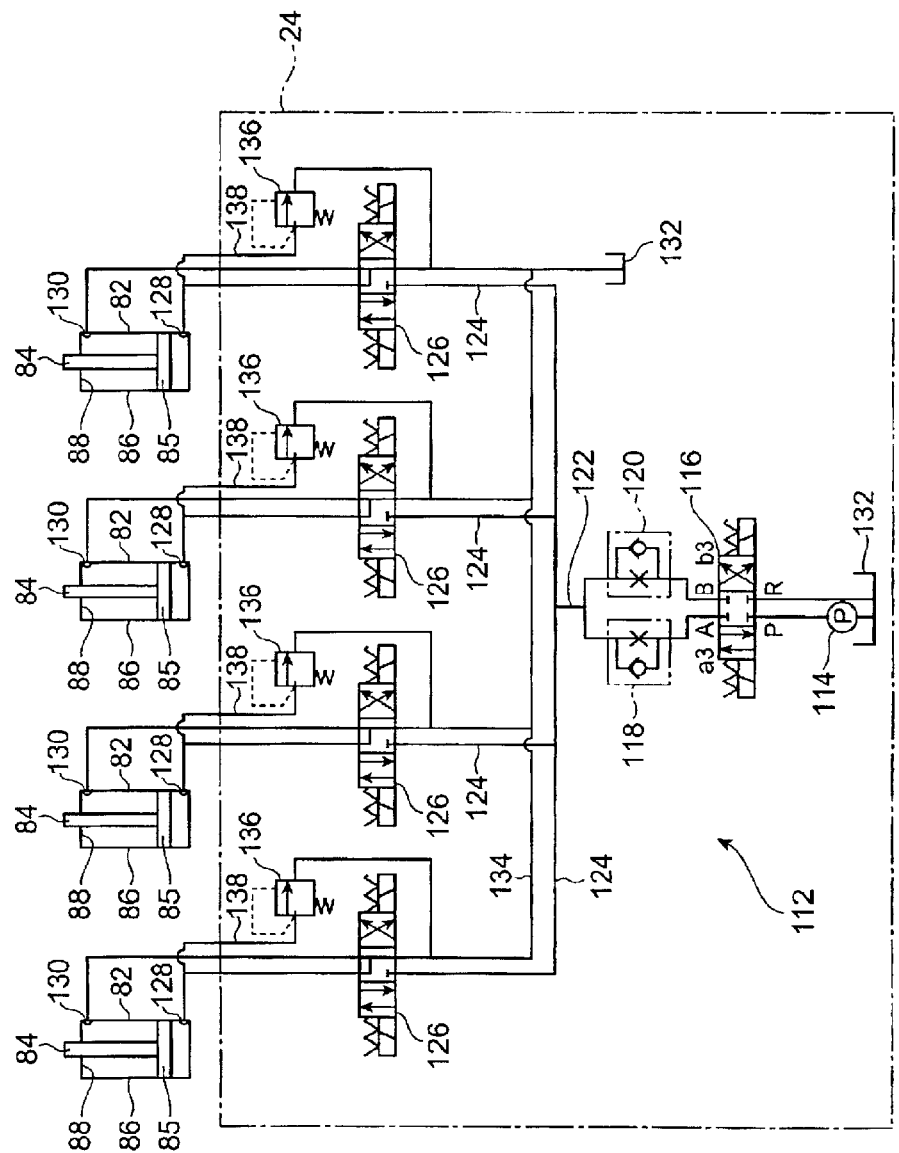
FIG. 4 is a hydraulic circuit diagram showing a hydraulic control unit for hydraulic control of the hydraulic cylinder shown in FIG. 1.

As shown in FIG. 1 and FIG. 4, the hydraulic cylinders 82 are connected to a hydraulic control unit 112 installed inside the control box 24. The hydraulic control unit 112 has a hydraulic pump 114 serving as a drive source of hydraulic cylinders 82. A direction switching valve 116, preferably, a three-position four-port electromagnetic spool valve, is connected to the discharge side of hydraulic pump 114. The A port and B port of the direction switching valve 116 are respectively connected to flow rate adjusting valves 118, 120 of pressure compensation type, and those flow rate adjusting valves 118, 120 form a parallel circuit. In the direction switching valve 116, in a neutral position, the P port and R port are interconnected and the A port and B port are closed. Furthermore, in a first position a3, the P port and A port are interconnected to each other and the R port and B port are interconnected to each other. In the second position b3, the P port and B port are interconnected and the R port and A port are interconnected to each other. Therefore, if the direction switching valve 116 is switched from the close center position to either the first position a3 or second position b3 alternatively, the working fluid supplied under pressure from the hydraulic pump 114 will be supplied toward the hydraulic cylinder 82 via the working fluid supply line 122 at a flow rate set by the flow rate adjusting valves 118, 120.

The working fluid supply line 122 is branched to all hydraulic cylinders 82, and each branch line 124 is connected to a direction switching valve 126, preferably, a three-position four-port electromagnetic spool valve. The A port of each direction switching valve 126 is connected to the head-side port 128 of the corresponding hydraulic cylinder 82. Furthermore, the B port of each direction switching valve 126 is connected to the rod-side port 130 of the corresponding hydraulic cylinder 82. A recovery line 134 for returning the working fluid into the oil tank 130 is connected to the R port of direction switching valve 126. The direction switching valve 126 is similar to the direction switching valve 116. In the neutral position thereof, the P port and R port are interconnected to each other and the A port and B port are closed. Furthermore, in a first position a4, the P port and A port are interconnected to each other and the R port and B port are interconnected to each other. In a second position b4, the P port and B port are interconnected to each other and the R port and A port are interconnected to each other.

Lines 138 having pressure control valves 136, preferably, relief valves, inserted therein are connected between the R ports of direction switching valves 126 and ports 128 of the corresponding hydraulic cylinders 82. The pressure control valves 136 are designed to become open when the pressure in the hydraulic cylinder 82 becomes no less than the set pressure P.

In such a hydraulic control unit, if the positions of all direction switching valves 116, 126 are switched to the first positions a3, a4, the working fluid discharged from the hydraulic pump 114 flows in the working fluid supply line 122 at a flow rate set by the flow rate adjustment valve 118. The working fluid then flows into the branch lines 124 in equal amounts and then flows into head-side ports 128 of hydraulic cylinders 82 via the direction switching valves 126. Therefore, piston rods 84 of all hydraulic cylinders 82 are protruded synchronously and at the same speed from the cylinder tubes 86. At this time, the working fluid discharged through the rod-side ports 130 is returned into the oil tank 132 from the direction switching valve 126 via the recovery line 134.

Furthermore, if the piston rods 84 of hydraulic cylinders 82 are protruded, the pistons 85 are eventually brought in contact with the upper end portions 88 of cylinder tubes 86 and stopped. In the most protruding position, as described above, the movable mold plate 34 is retracted to a half-open position and the mold 30 is maintained in the half-open position.

When in this state a load toward the cylinder tube 86 side is applied, for example, to the piston rod 84 of hydraulic cylinder 82 and the pressure of head-side port 128 exceeds the set pressure P of pressure control valve 136, the pressure control valve 136 is opened and the working fluid is discharged through the port 128 and then flows into the recovery line 134. Therefore, the piston rod 84 is lowered. Here, when the mold clamping force acting on the piston rod 84 of hydraulic cylinder 82 from the ram 46 of mold clamping cylinder 42 is the first mold clamping force F1, which is the larger one of the mold clamping forces, the set pressure P of pressure control valve 136 is a value at which the pressure control valve 136 is opened and the piston rod 84 is lowered. On the other hand, when the mold clamping force acting on the piston rod 84 of hydraulic cylinder 82 from the ram 46 is the second mold clamping force F2, which is the smaller one of the mold clamping forces, the set pressure P is a value at which the pressure control valve 136 is kept closed and the piston rod 84 is raised. Thus, since in the present embodiment there are four hydraulic cylinders 82, the set pressure P of pressure control valve 136 is determined so that the relations represented by the following formula is satisfied (here, Ap stands for the surface area of piston 85).

$$F1/4Ap > P > F2/4Ap.$$

Further, if the direction switching valve 126 is switched to a second position b4 and the working fluid is supplied to the rod-side port 130 of hydraulic cylinder 82, the piston rod 84 is pulled into the cylinder tube 86 and reaches the lower stroke end, which is the most retracted position. At this time, the working fluid discharged through the head-side port 128 returns to the oil tank 132 via the recovery line 134.

Figure 5:
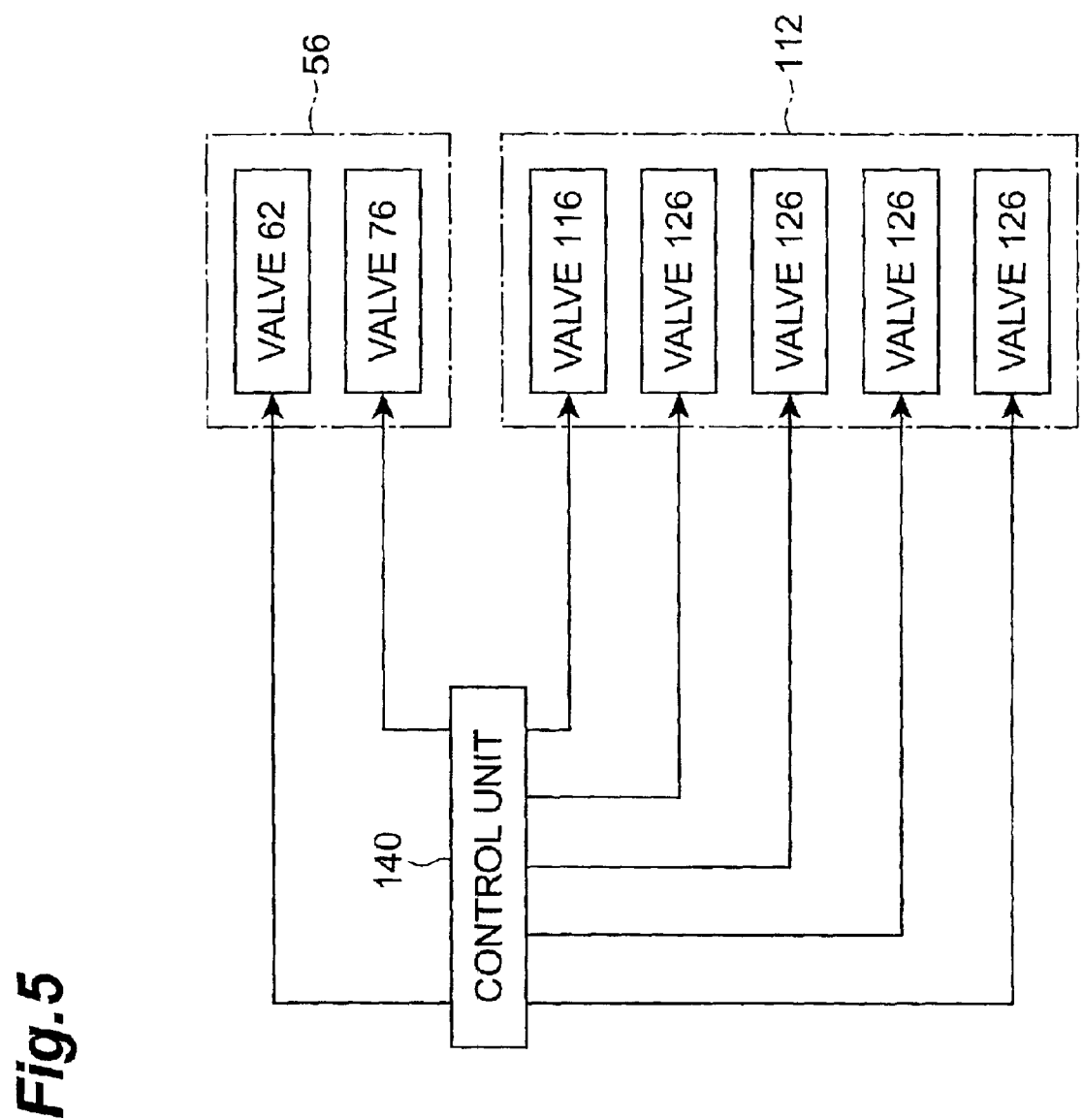
FIG. 5 is a block diagram showing a control unit for controlling a direction switching valve used in the hydraulic control unit shown in FIG. 3 and FIG. 4.

The flow of electric current in the solenoids of direction switching valves 116, 126 in the hydraulic control unit 112 is controlled and the positions of those valves 116, 126 are switched by a control unit (control means) 140 such as a sequencer or a microcomputer, as shown in FIG. 5. The control unit 140 is used both for controlling the position switching of direction switching valves 62, 76 in the hydraulic control unit 56 which conducts hydraulic control of mold clamping cylinder 42 and for controlling the operation of the entire injection molding apparatus 12.

Foam molding conducted in the injection molding apparatus 12 having the mold clamping unit 10 of the above-described structure will be explained below with reference to the flow chart shown in FIG. 6.

First, if the operation switch (not shown) of injection molding apparatus 12 is turned on, the direction switching valve 76 of hydraulic control unit 56 relating to the mold clamping cylinder 42 is maintained in the initial first position a2, as shown in FIG. 2, and the first pressure control valve 78 and line 66 are interconnected to each other. In this state, the mold clamping force generated by the mold clamping cylinder 42 is set at the first mold clamping force F1 as described above.

Then, the direction switching valves 116, 126 of hydraulic control unit 112 are switched to the first positions a3, a4 by a control signal from the control unit 140, and the piston rods 84 of hydraulic cylinders 82 are moved to the most protruding position (step ST1). When the rods 84 arrive at their most protruding positions, the pistons 85 are brought in contact with and stopped by the upper end portions 88, which are stoppers. In this state, the resultant force acting on pistons 85 and, therefore, rods 84 of the four hydraulic cylinders 82, that is, the mold opening force F3 is held to a value F3=P×Ap×4 determined depending upon the pressure P set by the pressure control valve 136, for example, to 200 tons.

Then, in step ST2, the control unit 140 actuates the hydraulic pump 60 and, at the same time, sets the direction switching valve 62 into the first position a1, thereby supplying the working fluid from line 66 to the head-side port 64 of mold clamping cylinder 42. As a result, the ram 46 of mold clamping cylinder 42 is extended downward and the mold 30 comes into a completely closed state. In this state, the set pressure of the first pressure control valve 78 becomes the pressure under which the working fluid is supplied to the mold clamping cylinder 42 and the mold 30 is clamped by the first mold clamping force F1 determined depending upon this set pressure (in the present embodiment, for example, if the force acting on the ram 46 under the set pressure of pressure control valve 78 is set at 500 tons, then the first mold clamping force will be a magnitude obtained by adding the weights of movable mold plate 34, mounting plate 48, and ram 46 to 500 tons). As understood from Formula (1) presented above, the first mold clamping force F1 is set larger than the mold opening force F3, which is a resultant of forces acting on the piston rods 84 of four hydraulic cylinders 82. As a result, if the ram 46 moves downward in step ST2, the outer peripheral part of mounting plate 48 is brought in contact with the upper ends of piston rods 84 which are in the most protruding position, then the pressure control valve 136 is opened and the piston rods 84 are pushed forcibly into the cylinder tubes 86. As a result, the movable mold plate 34 moves down and the mold 30 comes into a completely closed state.

Then, in step ST3, the control unit 140 actuates the injector 14, thereby injecting the plasticized foamable resin into a cavity (not shown) of the closed mold 30 from the injection nozzle 28, and the system waits in step ST4 till the set time elapses. As a result, the plasticized resin is packed into the cavity of mold 30 and is shaped therein.

Then, the mold clamping force is reduced in step ST5. Thus, the control unit 140 switches the position of direction switching valve 76 of hydraulic control unit 56 to the second position b2 and allows the second pressure control valve 80 and line 66 to interconnect to each other. As a result, the mold clamping force of mold clamping cylinder 42 becomes the second mold clamping force F2 determined depending upon the second pressure control valve 80. This second mold clamping force F2, as shown by the Formula (1) presented above, is smaller than the mold opening force F3. If, for example, the downward force acting on the ram 46 of mold clamping cylinder 42 is 100 tons when the working fluid is supplied under the set pressure of the second pressure control valve 80, the second mold clamping force F2 becomes a magnitude obtained by adding the weights of movable mold plate 34, mounting plate 48, and ram 46 to 100 tons.

During this period, the working fluid is continuously supplied to the head-side port 128 of hydraulic cylinders 82. Therefore, if the mold clamping force is reduced, the piston rods 84 of the four hydraulic cylinders 82 rise overcoming the force F2 from the ram 48 of mold clamping cylinder 42, and the pistons 85 move to the upper stroke end in which they are brought in contact with the upper end portions 88 of cylinder tubes 86. Therefore, the piston rods 84 of hydraulic cylinders 82 raise the mounting plate 48 together with movable mold plate 34 and, as a result, the movable mold plate 34 recedes from the fixed mold plate 32 and the mold 30 is held in a half-open state shown by a solid line in FIG. 1. In this case, the piston rods 84 of hydraulic cylinders rise till the pistons 85 come into contact with the upper end portions 88 of cylinder tubes 86, which serve as stop means, and stop therein. Therefore, the final stop positions of the upper ends of piston rods are accurately determined. Thus, the accuracy of traveling distance of movable mold plate 34 which is moved to the half-open position by the hydraulic cylinder 82 is extremely higher than that in the conventional structures in which the movable plate was moved only by a large mold clamping cylinder. Therefore, the spacing between the movable mold plate and fixed mold plate in the half-open state becomes more accurate than that in above-described conventional mold clamping units. Furthermore, the amount of the working fluid necessary for moving the movable mold plate 34 from the closed position to the half-open position can be significantly less than the amount of the working fluid necessary to move the movable plate 34 from the closed position to the half-open position only by the mold clamping cylinder 42 having a capacity significantly larger than that of hydraulic cylinders. This makes it possible to move the movable plate from the closed position to the half-open position at a high speed and to improve the response of mold clamping motion.

If the mold 30 is thus set into the half-open position, the pressure inside the cavity of mold 30 drops rapidly. As a result, the plasticized resin is foamed under the effect of a foaming agent added to the plasticized resin. Waiting for a fixed time (step ST6) in the half-open state completes foaming of plasticized resin inside the mold 30.

Then, in step ST7, the control unit 140 switches the position of direction switching valve 62 of hydraulic control unit 56 to the second position b1. As a result, the working fluid from pump 60 is supplied to the ram-side port 68 of mold clamping cylinder 42, the ram 46 rises, and the movable mold plate 34 mounted on the ram 46 rises to the fully open position shown by a virtual line in FIG. 1. The molding operation is then completed by removing the molding remaining on the fixed mold plate.

As described above, the spacing between the fixed mold plate 32 and movable mold plate 34 of mold 30 in the half-open state is accurately determined and the high-speed response of mold opening motion is improved. Therefore, defects such as the occurrence of a variation in the thickness of foamed moldings are eliminated and products with a certain quality can be always obtained.

Figure 7:
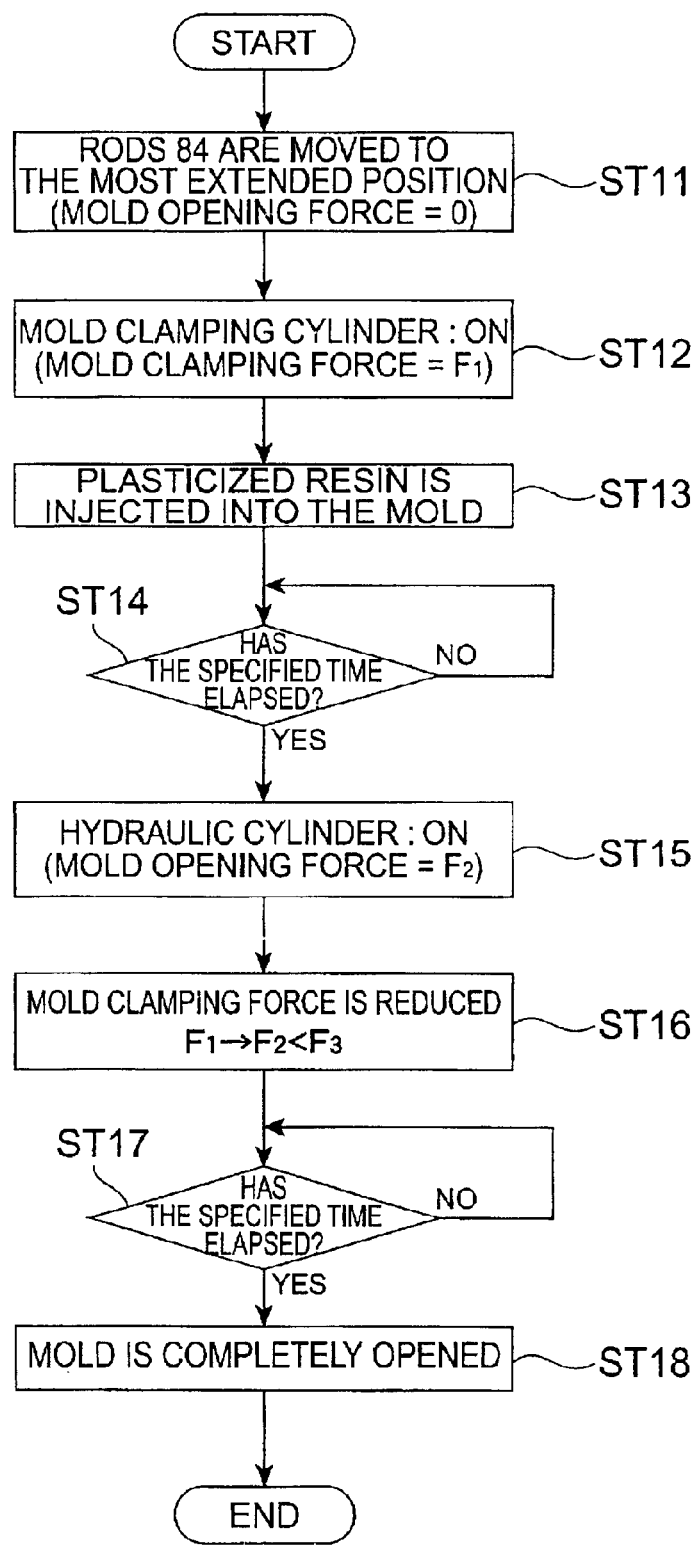
FIG. 7 is a flow chart illustrating another sequence of operations of the injection molding apparatus shown in FIG. 1.

The sequence of operations implemented when foam molding is conducted by using the injection molding apparatus 12 is not limited to those described above. FIG. 7 is a flow chart illustrating a different sequence of operations.

Figure 6:
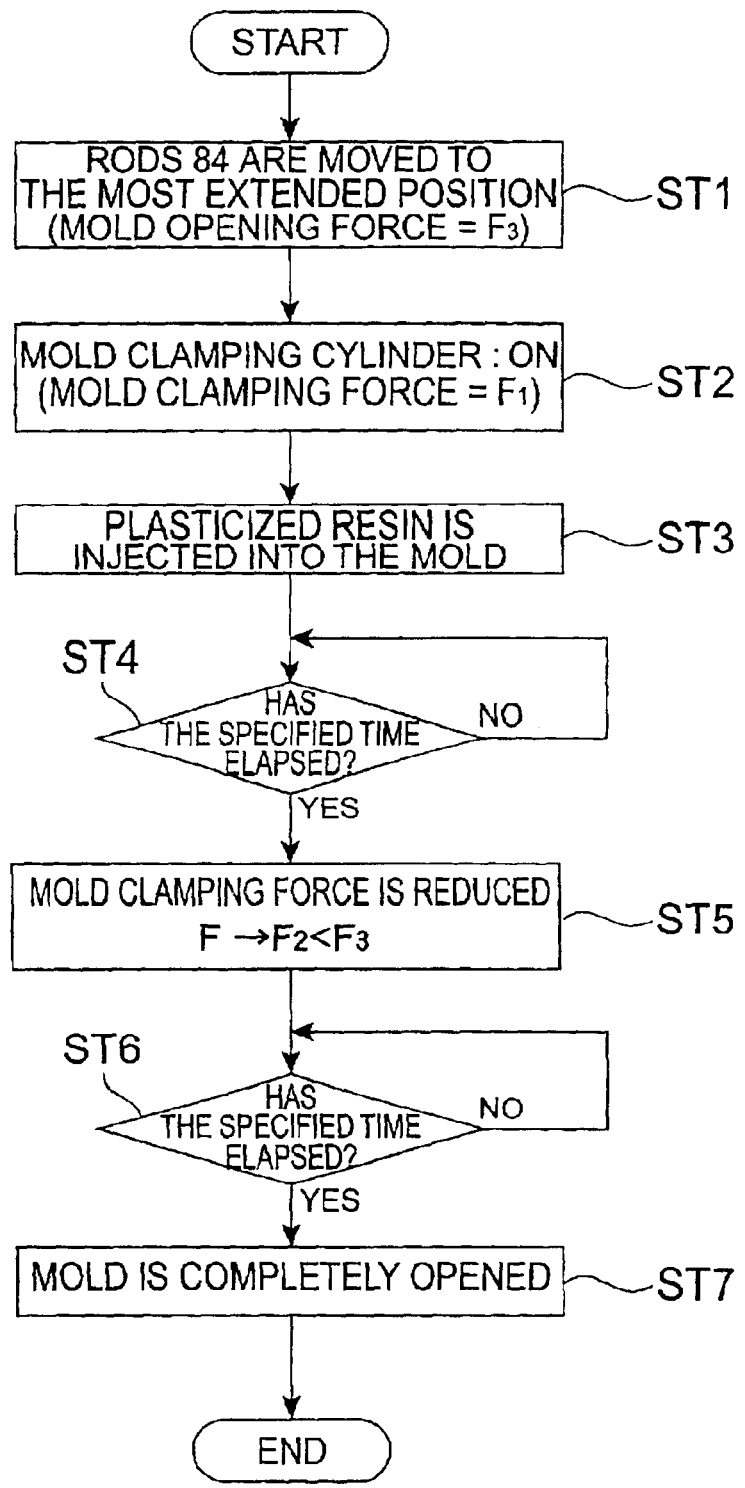
FIG. 6 is a flow chart illustrating the sequence of operations of the injection molding apparatus shown in FIG. 1.

In the sequence of operations shown in FIG. 7, in step ST11, the piston rods 84 of hydraulic cylinders 82 are moved to the most protruding position, similarly to step ST1 shown in FIG. 6, but the difference between this sequence and that shown in FIG. 6 is that the direction control valve 126 of hydraulic control unit 112 is returned to the neutral position and the upward force of piston rods 84 of hydraulic cylinders 82 is eliminated. The piston rods 84 are moved into the most protruding position, despite the elimination of propulsion force of piston rods 84, for the following reason. Thus, if the movable mold plate 34 is moved to the closed position by the mold clamping cylinder 42 in a state in which the piston rods 84 are not protruded and are set in the most retracted position, a very small gap may be formed between the mounting plate 48 on which the movable mold plate 34 was mounted and the upper end portions of piston rods 84. In such a case, when the movable mold plate 34 is moved from the closed position to the half-open position by the hydraulic cylinders 82, the piston rods 84 must be moved by a distance equal to the aforementioned gap, and the response during mold opening to the half-open state becomes poor accordingly. Therefore, moving the movable mold plate to the closed position after the piston rods 84 of hydraulic cylinders 82 have been brought into the most protruding state prevents the appearance of such a gap between the piston rods 84 and movable mold mounting plate 48 in the closed position.

After step ST11, similarly to steps ST2–ST4 shown in FIG. 6, the mold 30 is held in a closed state by the mold clamping force F1 set by the first pressure control valve 78, the injector 14 fills the cavity of mold 30 with a plasticized resin, and the resin is allowed to stay therein for a certain time (steps ST12–ST14).

Then, in step ST15, the control unit 140 places the direction switching valves 126 of hydraulic control unit 112 relating to hydraulic cylinders 82 into position a4, thereby supplying the working fluid to the head-side ports 128 of hydraulic cylinders 82, and the upward propulsion force is generated in the piston rods 84 of hydraulic cylinders 82. The mold opening force F3, which is the resultant of those propulsion forces, is smaller than the mold clamping force F1 of mold clamping cylinder 42 at this point of time. Therefore, the mold 30 maintains the closed state.

Then, in step ST16, the control unit 140 switches the position of direction switching valve 76 in hydraulic control unit 56 relating to mold clamping cylinder 42 to the second position b2. As a result, the mold clamping force of mold clamping cylinder 82 becomes force F2 which is less than the force F3, and the piston rods 84 of hydraulic cylinders 80 raise the mounting plate 48 and movable mold plate 34 to the half-open position.

Once waiting for the predetermined time has been thereafter executed in step ST17, the mold 30 is restored to a fully open state in step 18 and the molding is removed.

While the present invention and advantages thereof have been explained herein, the above-described embodiments are merely examples and various changes in the shape, configuration and arrangement may be resorted to, without departing from the spirit or scope of the invention.

For example, in the above-described embodiment, an extension and contraction mechanism such as a hydraulic cylinder or a fluid pressure actuator was employed as mold opening means for moving the movable mold plate 34 from the closed position to the half-open position. However, a mechanical extension and contraction mechanism may also be used as shown in FIG. 8. More specifically, the mechanical extraction-contraction mechanism shown in FIG. 8 comprises a tube 200 secured to the upper surface of the upper block of position adjusting tool 90 and having a central axial line directed vertically up instead of the hydraulic cylinder 82 shown in FIG. 1 and FIG. 3. A female screw member 202 such as a nut is rotatably and coaxially mounted on the upper end of tube 200. A screw shaft 204 is screwed into the female screw member 202, and the portion of screw shaft 204 protruding downward from the female screw member 202 is inserted into the central opening of tube 200. Furthermore, a slit extending along the central axial line is formed on the outer peripheral surface of screw shaft 204 (this slit is not shown in the figures) and is engaged with the projection protruding from the inner peripheral surface of tube 200. As a result, the screw shaft 204 can move up and down with respect to the tube 200, but the rotation thereof is restricted. Moreover, a plurality of teeth (not shown) are formed on the outer peripheral surface of female screw member 202 and an endless transmission chain 206 is wound thereon. The transmission chain 206 is also wound on a sprocket 210 of the output shaft of motor 208 serving as a drive source fixedly mounted on the mounting stand 36.

In such a configuration, if the motor 208 is driven and the female screw member 202 is rotated via the transmission chain 206, the screw shaft 204 is raised or lowered. As a result, the mounting plate 48 which is in contact with the upper end of screw shaft is pushed up similarly to the above-described hydraulic cylinder 82, and the movable mold plate 34 is moved from the closed position to the half-open position.

In FIG. 8, parts identical or equivalent to those shown in FIG. 3 are assigned with the same reference symbols and the detailed explanation thereof is omitted.

Furthermore, a four-member link or cam mechanism may be used as means for moving the movable mold plate 34 from the closed position to the half-open position, and the movable mold plate 34 or mounting plate 48 may be moved thereby.

Moreover, in the above-described embodiment, the plasticized resin is injected in the mold maintained in the closed state. However, a system (injection press system) in which a plasticized resin is injected into a slightly opened mold and then the mold is brought into its closed state and the plasticized resin is expanded inside the cavity can be also employed in the above-described injection molding apparatus.

Furthermore, the above-described embodiment related to a vertical mold clamping unit that clamps the mold in the up-down direction. However, a mold clamping apparatus may also be of transverse type. Thus, for example, the entire mold clamping apparatus 10 can be disposed sideways and the mold 30 can be clamped sideways.

In the above-described embodiment, the movable mold plate 34 is stopped for the predetermined period of time in a half-open position and then is directly moved to the fully open position. However, the movable mold plate 34 may also be moved from the half-open position toward the closed position again and then moved to the fully open position.

More specifically, the movable mold plate 34 is moved from the closed position to the half-open position with the hydraulic cylinder 82 and then the mold clamping force is returned to the mold clamping force F1 which was applied before the reduction of the mold clamping force of mold clamping cylinder 42 (the propulsion force of hydraulic cylinder 82 may be eliminated). In such a case, the mold clamping force of mold clamping cylinder 42 becomes greater than the mold opening force generated by the hydraulic cylinder 82 and the movable mold plate 34 moves again toward the closed position.

By such a method, when a foam molding operation is conducted in which the movable mold plate 34 is retracted from the closed position to the half-open position and the plasticized resin present in the cavity is foamed, the resin in a semi-hardened state that is contained in the mold 30 can be compressed again with the mold 30 and, therefore, warpage of the molding can be effectively prevented.

Furthermore, in the above-described embodiment, the propulsion force is generated in the hydraulic cylinders 82 in advance prior to the reduction of the mold clamping force generated by the mold clamping cylinder 42. However, the movable mold plate 34 may be moved to the half-open position by generating propulsion force in the hydraulic cylinder 82 after the mold clamping force has been reduced.

Moreover, the application of the mold clamping unit in accordance with the present invention is not limited to the injection molding apparatus, provided that the molding apparatus conducts molding in a sequence such that the movable mold plate is moved from the closed position to the half-open position and then to the fully open position.

What is claimed is:

1. A mold clamping unit which is used in a molding apparatus and serves to open and close a mold having a movable mold plate and a fixed mold plate, said mold clamping unit comprising:

a mold clamping cylinder driven by supply or discharge of a working fluid, said mold clamping cylinder for moving said movable mold plate between a fully open position in which said movable mold plate is separated by a predetermined distance from said fixed mold plate and a closed position in which said movable mold plate is in contact with said fixed plate;

mold opening means for applying a mold opening force of a predetermined magnitude to said movable mold plate in the direction from said closed position toward said fully open position and moving said movable mold plate from said closed position to a predetermined half-open position located between said closed position and said fully open position;

switching means for switching a mold clamping force generated by said mold clamping cylinder between a first mold clamping force which is larger than said mold opening force and a second mold clamping force which is smaller than said mold opening force by switching the supply pressure of the working fluid supplied to said mold clamping cylinder; and control means for controlling said mold opening means and said switching means, a mounting stand on which said fixed mold plate is mounted;

a mounting plate on which said movable mold plate is mounted, wherein said mold opening means comprises an extension and contraction mechanism which is disposed between said mounting stand and said mounting plate and can extend and contract along the mold clamping direction, a drive source for driving said extension and contraction mechanism, and stop means for stopping the extension and contraction motion of said extension and contraction mechanism when said movable mold plate has been moved from said closed position to said half-open position; and a position adjusting tool, disposed between said extension and contraction mechanism and said mounting stand, capable of adjusting the position said of extension contraction mechanism in the mold clamping direction, said position adjusting tool comprising a first block having a first surface and a second surface on the side opposite to the first surface and a second block having a third surface that is slidably in contact with said second surface of said first block and a fourth surface on the side opposite to the third surface and has a configuration, with respect to said first and second blocks, such that the spacing between said first surface and said fourth surface can be adjusted by the mutual wedge effect of said first block and said second block.

2. An injection molding apparatus comprising:

a mold having a fixed mold plate and a movable mold plate;

an injector for injecting a plasticized resin into a cavity of said mold closed; and a mold clamping unit for opening and closing said mold, wherein said mold clamping unit comprises:

a mold clamping cylinder which is driven by supply or discharge of a working fluid, and moves said movable mold plate between a fully open position in which said movable mold plate is separated by a predetermined distance from said fixed mold plate and a closed position in which said movable mold plate is in contact with said fixed plate;

mold opening means for applying a mold opening force of a predetermined magnitude to said movable mold plate in the direction from said closed position toward said fully open position and moving said movable mold plate from said closed position to a predetermined half-open position located between said closed position and said fully open position;

switching means for switching a mold clamping force generated by said mold clamping cylinder between a first mold clamping force which is larger than said mold opening force and a second mold clamping force which is smaller than said mold opening force by switching the supply pressure of said working fluid supplied to said mold clamping cylinder;

control for controlling said mold means opening means and said switching means;

a mounting stand on which said fixed mold plate is mounted and an mounting plate on which said movable mold plate is mounted, wherein said mold opening means comprises an extension and contraction mechanism which is disposed between said mounting stand and said mounting plate and can extend and contract along the mold clamping direction, a drive driving said source for extension and contraction mechanism, and stop means for stopping the extension and contraction motion of said extension and contraction mechanism when said movable mold plate has been moved from said closed position to said half-open position;

a position adjusting tool, disposed between said extension and contraction mechanism and said mounting stand, capable of adjusting the position of said extension and contraction mechanism in the mold clamping direction, said position adjusting tool comprising a first block having a first surface and a second surface on the side opposite to the first surface and a second block having a third surface that is slidably in contact with said second surface of said first block and a fourth surface on the side opposite to the third surface and has a configuration, with respect to said first and second blocks, such that the spacing between said first surface and said fourth surface can be adjusted by the mutual wedge effect of said first block and said second block.

3. A mold clamping unit which is used in a molding apparatus and serves to open and close a mold having a movable mold plate and a fixed mold plate, said mold clamping unit comprising:

a mold clamping cylinder driven by supply or discharge of a working fluid, said mold clamping cylinder for moving said movable mold plate between a fully open position in which said movable mold plate is separated by a predetermined distance from said fixed mold plate and a closed position in which said movable mold plate is in contact with said fixed plate;

mold opening means for applying a mold opening force of a predetermined magnitude to said movable mold plate in the direction from said closed position toward said fully open position and moving said movable mold plate from said closed position to a predetermined half-open position located between said closed position and said fully open position, said mold opening means being independent of said mold clamping cylinder;

switching means for switching a mold clamping force generated by said mold clamping cylinder between a first mold clamping force which is larger than said mold opening force and a second mold clamping force which is smaller than said mold opening force by switching the supply pressure of the working fluid supplied to said mold clamping cylinder; and control means for controlling said mold opening means and said switching means.

4. The mold clamping unit according to claim 3, wherein said control means controls said switching means so that said mold clamping force becomes said first mold clamping force for moving said movable mold plate to said closed position.

5. The mold clamping unit according to claim 3, wherein said control means controls said mold opening means and also controls said switching means so that said mold clamping force becomes said second mold clamping force, for moving said movable mold plate from said closed position to said half-open position.

6. The mold clamping unit according to claim 3, wherein said control means controls said mold opening means and also controls said switching means so that mold clamping force becomes said second mold clamping force for moving said movable mold plate from said closed position to said half-open position, and after said movable mold plate has been moved to said half-open position, said control means controls said switching means so that said mold clamping force becomes said first mold clamping force, for moving said movable mold plate toward said closed position.

7. The mold clamping unit according to claim 3, comprising a mounting stand on which said fixed mold plate is mounted and a mounting plate on which said movable mold plate is mounted, wherein said mold opening means comprises an extension and contraction mechanism which is disposed between said mounting stand and said mounting plate and can extend and contract along the mold clamping direction, a drive source for driving said extension and mechanism, and stop means for stopping the extension and contraction motion of said extension and contraction mechanism when said movable mold plate has been moved from said closed position to said half-open position.

8. The mold clamping unit according to claim 7, wherein said extension and contraction mechanism is a hydraulic cylinder; said drive source is a hydraulic pump supplying a working fluid to said hydraulic cylinder; and said stop means is an end portion on the rod side of a cylinder tube which is brought in contact with the piston when said hydraulic cylinder extends.

9. The mold clamping unit according to claim 7, comprising a position adjusting tool, disposed between said extension and contraction mechanism and said mounting stand, for adjusting the position said of extension contraction mechanism in the mold clamping direction.

10. The clamp molding unit according to claim 3, wherein said molding apparatus is an injection molding apparatus.

11. An injection molding apparatus comprising:

a mold having a fixed mold plate and a movable mold plate;

an injector for injecting a plasticized resin into a cavity of said mold closed; and a mold clamping unit for opening and closing said mold, wherein said mold clamping unit comprises:

a mold clamping cylinder which is driven by supply or discharge of a working fluid, and moves said movable mold plate between a fully open position in which said movable mold plate is separated by a predetermined distance from said fixed mold plate and a closed position in which said movable mold plate is in contact with said fixed plate;

mold opening means for applying a mold opening force of a predetermined magnitude to said movable mold plate in the direction from said closed position toward said fully open position and moving said movable mold plate from said closed position to a predetermined half-open position located between said closed position and said fully open position, said mold opening means being independent of said mold clamping cylinder;

switching means for switching a mold clamping force generated by said mold clamping cylinder between a first mold clamping force which is larger than said mold opening force and a second mold clamping force which is smaller than said mold opening force by switching the supply pressure of said working fluid supplied to said mold clamping cylinder; and control means for controlling said mold opening means and said switching means.

12. The injection molding apparatus according to claim 11, wherein said control means controls said switching means so that said mold clamping force becomes said first mold clamping force for moving said movable mold plate to said closed position.

13. The injection molding apparatus according to claim 11, wherein said control means controls said mold opening means and also controls said switching means so that said mold clamping force becomes said second mold clamping force, for moving said movable mold plate from said closed position to said half-open position.

14. The injection molding apparatus according to claim 11, wherein said control means controls said mold opening means and also controls said switching means so that said mold clamping force becomes said second mold clamping force, for moving said movable mold plate from said closed position to said half-open position, and after said movable mold plate has been moved to said half-open position, said control means controls said switching means so that said mold clamping force becomes said first mold clamping force, for moving said movable mold plate toward said closed position.

15. The injection molding apparatus according to claim 11, comprising a mounting stand on which said fixed mold plate is mounted and an mounting plate on which said movable mold plate is mounted, wherein said mold opening means comprises an extension and contraction mechanism which is disposed between said mounting stand and said mounting plate and can extend and contract along the mold clamping direction, a drive driving said source for extension and contraction mechanism, and stop means for stopping the extension and contraction motion of said extension and contraction mechanism when said movable mold plate has been moved from said closed position to said half-open position.

16. The injection molding apparatus according to claim 15, wherein said extension and contraction mechanism is a hydraulic cylinder; said drive source is a hydraulic pump supplying a working fluid to said hydraulic cylinder; and said stop means is an end portion on the rod side of a cylinder tube which is brought in contact with the piston when said hydraulic cylinder extends.

17. The injection molding apparatus according to claim 15, comprising a position adjusting tool, disposed between said extension and contraction mechanism and said mounting stand, for adjusting the position of said extension and contraction mechanism in the mold clamping direction.

* * * * *